(12) United States Patent
Yellepeddy et al.

(10) Patent No.: US 6,288,790 B1
(45) Date of Patent: *Sep. 11, 2001

(54) MOBILITY SUPPORT FOR PRINTING

(75) Inventors: Krishna Kishore Yellepeddy; Keith Edward Carter, both of Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,032

(22) Filed: May 15, 1998

(51) Int. Cl.[7] ..................................... G06F 15/00
(52) U.S. Cl. ...................... 358/1.15; 358/1.13; 358/1.14
(58) Field of Search .............................. 358/1.13, 1.14, 358/1.15, 1.16, 400, 402, 407, 434, 435, 436

(56) References Cited

U.S. PATENT DOCUMENTS

| | | | |
|---|---|---|---|
| 4,829,468 | 5/1989 | Nonaka et al. | 364/900 |
| 4,947,345 | 8/1990 | Paradise et al. | 364/519 |
| 5,287,461 | 2/1994 | Moore | 395/275 |
| 5,327,526 | 7/1994 | Nomura et al. | 358/1.16 |
| 5,367,673 | 11/1994 | Goldsmith et al. | 395/600 |
| 5,459,584 * | 10/1995 | Gordon et al. | 358/434 |
| 5,535,312 | 7/1996 | Hammer et al. | 358/1.16 |
| 5,566,278 | 10/1996 | Patel et al. | 358/1.15 |
| 5,602,974 | 2/1997 | Shaw et al. | 358/1.15 |
| 5,845,058 * | 12/1998 | Shaw et al. | 358/1.15 |
| 5,881,213 * | 3/1999 | Shaw et al. | 358/1.15 |
| 5,901,334 * | 5/1999 | Banks et al. | 395/876 |
| 5,923,826 * | 7/1999 | Greenda et al. | 358/1.16 |

* cited by examiner

Primary Examiner—Edward Coles
Assistant Examiner—Mark Wallerson
(74) Attorney, Agent, or Firm—Jeffrey S. LaBaw; Bracewell & Patterson, L.L.P.

(57) ABSTRACT

Data processing systems are provided with a mobile print support facility useful for mobile data processing systems such as laptops, notebooks, and the like. When a client data processing system is disconnected from a desired remote print server, or the remote print server is otherwise inaccessible, a local transient printer queue is automatically created and all print jobs submitted by the client data processing system are spooled to the transient printer queue. Once a transient printer queue is created, a mobile print connection manager periodically checks a status of the connection to the remote printer queue. When reconnected, print jobs within the transient printer queue are replayed to the remote printer queue. Print jobs may be replayed in the background or a replay GUI may be spawned to allow the user to manipulate transient printer queues and their contents. The replay GUI allows pending print jobs within a transient printer queue to be redirected to different remote printer queues, print servers, or print devices.

26 Claims, 7 Drawing Sheets

MOBILITY SUPPORT FOR PRINTING

BACKGROUND OF THE INVENTION

1. Technical Field

The present invention relates in general to print support for data processing systems and in particular to print support for mobile data processing systems or systems otherwise disconnected from a print server. Still more particularly, the present invention relates to a mobile print system employing transient queues to transparently support printing by data processing systems currently disconnected from a selected print server.

2. Description of the Related Art

A large and increasing number of data processing system user employ laptop, notebook, or otherwise mobile data processing systems. Such mobile data processing systems may be selectively connected and disconnected from networks, and may be utilized when connected to a network to print to a remote print server and printer. Presently, if a user submits a print job to a remote printer which is disconnected from the client data processing system at the time, or is connected in an unexpected manner (e.g., at an unexpected port address), an error occurs. This is a serious limitation of print systems for mobile users, since the mobile data processing system may be disconnected from the print queues and therefore unable to submit any print jobs until reconnected to the network and/or print queue.

Other situations in which a data processing system becomes disconnected from a remote, network print server include inaccessibility of the server with the remote printer queue due to a network error or shutdown of the server, failure of a user to logon to the network.

In yet another situation, a network services requested in a data processing system may not be running. For example, an application, utility, or operating system component responsible for requesting print services from a desired queue may not be active, as in the case of a print queue which is infrequently utilized (e.g., a color inkjet printer rather than a grayscale laser printer). In some instances, the remote print queue selected for printing may not be shared, as when the owner disables sharing in order to complete a special print job.

Existing operating system and network facilities, such as the Windows™ 95 operating system available from Microsoft Corporation of Redmond, Wash., permits a user of a data processing system configured for network connection to work "offline" with the data processing system, where the operating system is aware that the data processing system is not connected to the network and/or the selected print queue. However, the user must manually set a printer to work offline if the printer is not available, and print jobs may not be submitted while the user is working "offline." When the printer becomes available, the user must manually disable the Work Offline option.

It would be desirable, therefore, to provide transparent mobile print support for situations in which a data processing system is disconnected from a selected remote printer. It would further be advantageous for the print support to automatically and transparently detect disconnection and reconnection of the data processing system to the selected printer or print server.

SUMMARY OF THE INVENTION

It is therefore one object of the present invention to provide an improved method and apparatus for print support for data processing systems.

It is another object of the present invention to provide a method and apparatus for print support for mobile data processing systems or systems otherwise disconnected from a print server.

It is yet another object of the present invention to provide a mobile print system employing transient queues to transparently support printing by data processing systems Is currently disconnected from a selected print server.

The foregoing objects are achieved as is now described. Data processing systems are provided with a mobile print support facility useful for mobile data processing systems such as laptops, notebooks, and the like. When a client data processing system is disconnected from a desired remote print server, or the remote print server is otherwise inaccessible, a local transient printer queue is automatically created and all print jobs submitted by the client data processing system are spooled to the transient printer queue. Once a transient printer queue is created, a mobile print connection manager periodically checks a status of the connection to the remote printer queue. When reconnected, print jobs within the transient printer queue are replayed to the remote printer queue. Print jobs may be replayed in the background or a replay GUI may be spawned to allow the user to manipulate transient printer queues and their contents. The replay GUI allows pending print jobs within a transient printer queue to be redirected to different remote printer queues, print servers, or print devices.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
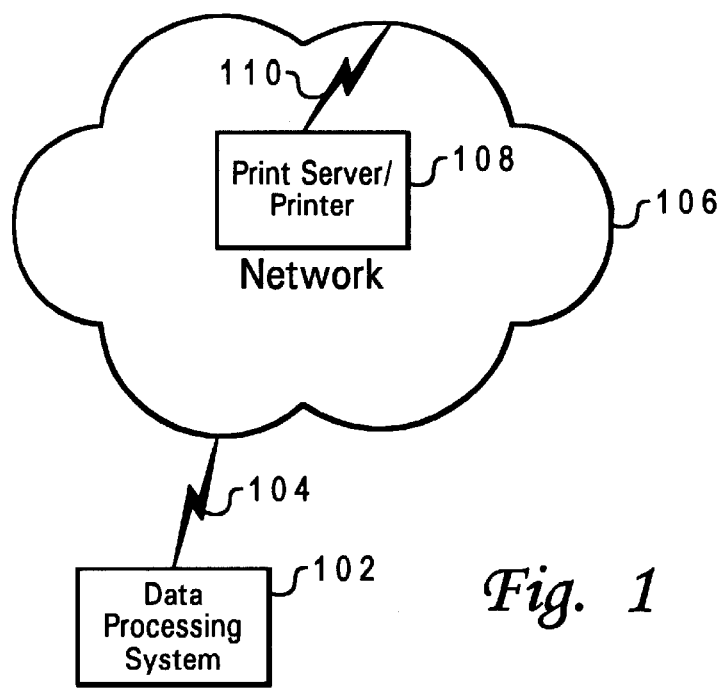
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. A data processing system 102, which may be either a desktop or a mobile data processing system, is coupled via communications link 104 to network 106. Data processing system 102 is a conventional data processing system including a processor, local memory, nonvolatile storage, and input/output devices such as a keyboard, mouse, trackball, and the like, all in accordance with the known art. Data processing system 102 in accordance with the present invention preferably includes and employs the OS/2 operating system or a similar operating system and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

In accordance with the known art, network 106 includes a print server/printer 108 serving print requests over network 106 received via communications link 110 between print server/printer 108 and network 106. The operating system on data processing system 102 is capable of selecting print server/printer 108 and submitting requests for services to print server/printer 108 over network 106. Print server/printer 108 includes a print queue for print jobs requested by remote data processing systems.

The data processing system network depicted in FIG. 1 is selected for the purposes of explaining and illustrating the present invention and is not intended to imply architectural limitations. Those skilled in the art will recognize that various additional components may be utilized in conjunction with the present invention. In accordance with the present invention, however, the data processing system includes mobile print support as described in further detail below.

Figure 2A:
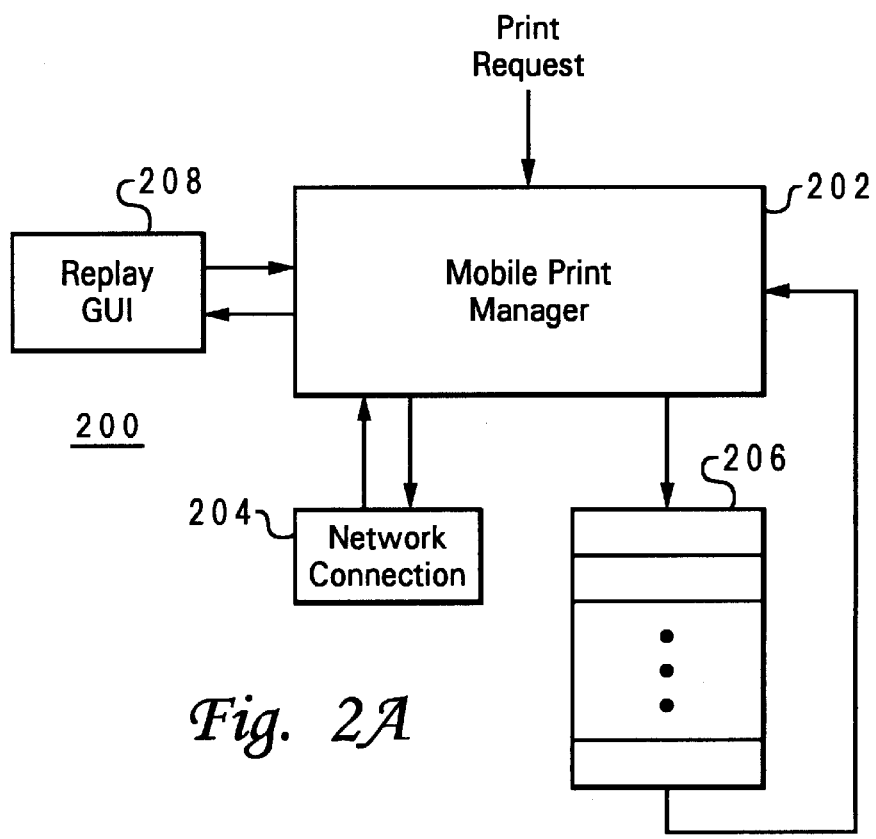
FIGS. 2A–2B are implementation diagrams of a mobile print support facility in accordance with a preferred embodiment of the present invention.
Figure 2B:
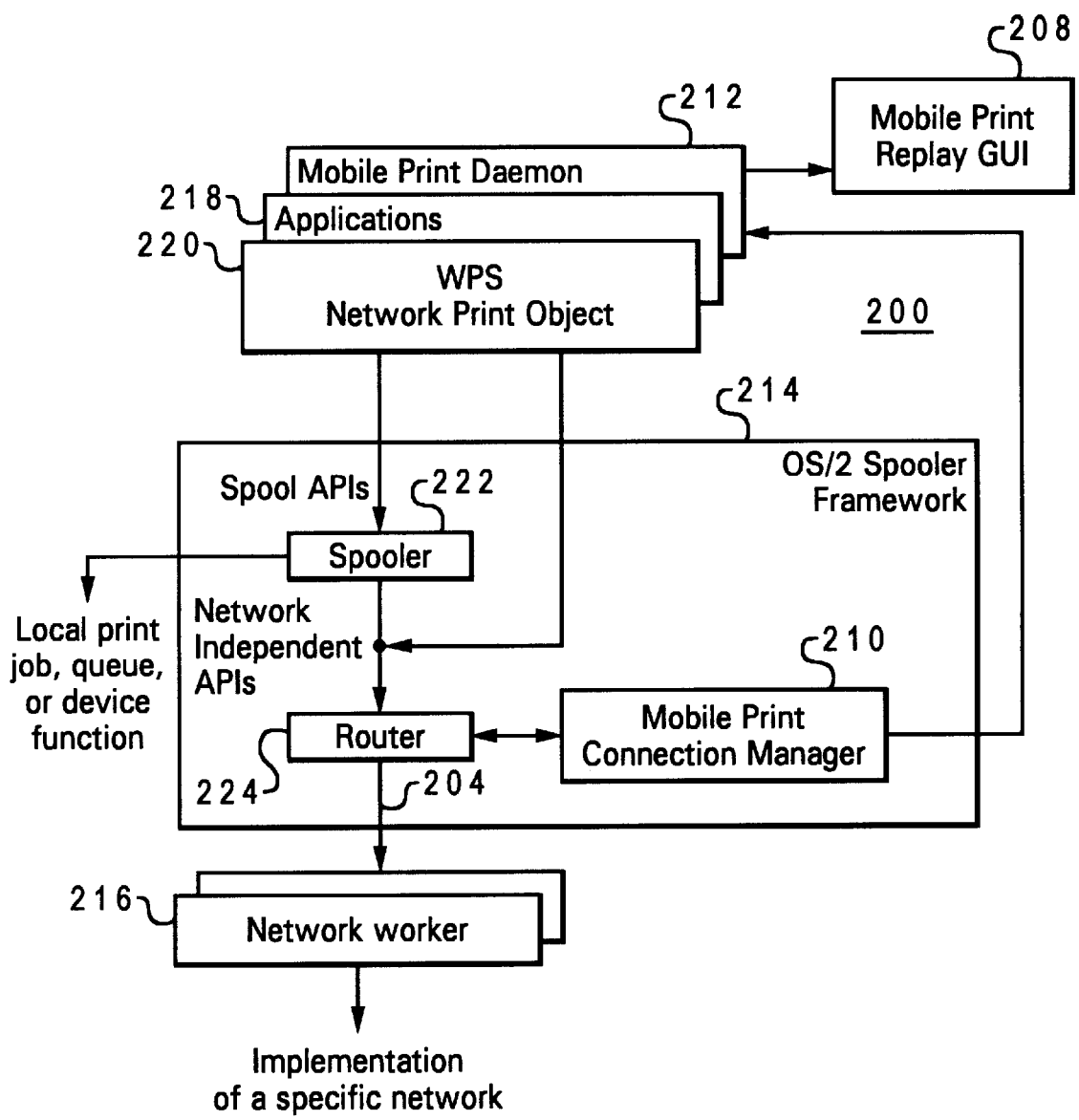

Referring to FIGS. 2A–2B, implementation diagrams of a mobile print support facility in accordance with a preferred embodiment of the present invention is illustrated. FIG. 2A illustrates in general the components of the mobile print support facility of the present invention. Mobile print support facility 200 is implemented within a data processing system, such as data processing system 102 depicted in FIG. 1, configured to submit print requests to a selected, remote print server and/or printer, such as print server/printer 108 depicted in FIG. 1.

Mobile print support facility 200 includes a mobile print manager 202 receiving print requests for printing services on a selected remote print server and/or printer. Mobile print manager 202 may check the status of network connection 204 to the network containing the selected remote print server/printer upon detecting a print request within the data processing system containing mobile print facility 200. Alternatively, mobile print manager 202 preferably detects errors which occur when a print job is submitted by the data processing system containing mobile print manager 200 to a remote printer queue which is in a disconnected state from the data processing system.

The error condition arising from submission of a print job to a remote queue which is in a disconnected state may result from a variety of conditions such as, for example:

1. the client data processing may be physically disconnected from the network containing the remote printer queue;
2. the network server with the remote printer queue may be inaccessible due to a network error or fault condition;
3. the network server with the remote printer queue may be shut down or offline;
4. the user may be logged off the network;
5. the print requester within the client data processing system may not be running; and
6. the remote printer queue may not be shared.

The last condition may occur if the user does not have the necessary access rights to submit jobs to the remote printer queue, in which case mobile print facility 200 does nothing. If the print requester is not running or the user is not logged onto the network, mobile print facility 200 first asks the user if they wish to start the print requester or logon to the network before entering mobile print mode.

If the user elects to enter mobile print mode, or if the remote printer queue is physically disconnected from the client data processing system or otherwise inaccessible (upon which condition mobile print facility 200 automatically enters mobile print mode), mobile print manager 202 creates a transient print queue 206 for the disconnected or inaccessible remote print queue to which a job has been submitted.

Transient print queue 206 is a local print queue within the data processing system containing mobile print facility 200, hidden from the end user. Transient print queue 206 is created in a "held" state, in which all print jobs contained within transient print queue 206 are held or stalled until released. Once transient print queue 206 is created, all jobs submitted to the remote printer queue are spooled to transient print queue 206 associated with that remote printer. Jobs spooled to transient print queue 206 may be replayed once a connection to the selected remote printer queue becomes available and transient print queue 206 is set to a release state.

Mobile print manager 202 determines when it is appropriate to replay print jobs within transient print queue 206 to the selected remote printer queue. Mobile print manager 202 periodically checks the connection status of the remote printer queue and, when a connection to the remote printer queue becomes available and transient print queue 206 has been released, initiates replay of any print jobs contained within transient print queue 206 to the selected remote printer queue.

Transient print queue 206 may be released utilizing replay graphical user interface (GUI) 208 or a similar replay user interface. When a connection to the desired remote printer queue is detected, mobile print manager 202 spawns replay GUI 208 as a separate child process. Replay GUI 208 gives the user the option of replaying print jobs within transient print queue 206, or within any other transient print queue created for another disconnected remote printer queue, to the now available remote printer queue. Replay GUI 208 also permits the user to manipulate both the transient print queues themselves and the print jobs within the transient print queue before replaying those print jobs to the print server. Replay GUI 208 is described in further detail below.

During replay, the status of each job in transient print queue 206 is checked. If the status of a print job is "hold", the print job is not spooled to the remote printer queue. If the status of a print job is "waiting", the print job is spooled to the remote printer queue. When there are no more print jobs within transient print queue 206, transient print queue 206 is destroyed.

FIG. 2B illustrates an implementation of the mobile print support facility of the present invention for the OS/2 operating system available from International Business Machines Corporation of Armonk, N.Y. Mobile print facility 200 in this implementation includes a mobile print connection manager 210 and a mobile print daemon 212, which together provide the equivalent functionality of mobile print manager 202 in FIG. 2A, as well as mobile print replay GUI 208.

The existing OS/2 spooler framework 214 employs network-independent application programming interfaces (APIs) to interface with service providers called network workers 216. Each network worker 216 supports print operations on remote printer queues and the print jobs within those queues, providing support for specific network implementations. Examples of network workers 216 include LAN Server network requesters, Netware network requesters, and AS/400 network requesters.

Applications 218 running on WorkPlace Shell (WPS) 220, such as the Network Print Object for the specific network implementation to which a data processing system containing mobile print facility 200 connects, may also invoke network workers 216 through the network-independent APIs, either directly or via spooler 222. The network-independent APIs are handled by router 224. For each print operation on a remote printer queue, router 224 invokes the dynamic link library (DLL) of network worker 216 for the network requester assigned to the remote printer queue. Router 224 receives feedback regarding the state of a connection to the remote printer queue from the network worker 216.

In the present invention, upon return from the network worker DLL, router 224 calls mobile print connection manager 210. Mobile print connection manager 210 checks the return code of the print operation by the network requester whose network worker DLL was invoked. When no transient printer queues exist for a selected remote printer queue, the first time that a print operation on a remote printer queue fails due to a disconnected condition, mobile print connection manager 210 creates a local transient printer queue (not shown) for the remote printer queue and informs mobile print daemon 212 of the new transient printer queue.

If the print operation requested from the remote printer queue is to print a job, mobile print connection manager 210 queues the print job to the transient printer queue and returns a "successful" return code to router 224, which then returns to application 218 or WPS NPO 220. For print operations which list jobs, query jobs, modify properties of jobs, and manage jobs within a network printer object (a local object containing the connection to the selected remote printer queue), mobile print connection manager 210 lists, queries, modifies, and manages jobs in the associated transient printer queue and returns a "successful" return code to router 224. For print operations which manage or modify properties of the network printer object for the remote printer queue, mobile print connection manager 210 does not perform the operation on the transient printer queue associated with the selected remote printer queue. However, job properties on a network printer object may be changed, and all subsequently submitted jobs to that network printer object will utilize the updated job properties.

All user operations on a network printer object, including dragging and dropping a document onto the network printer object, and all print operations from OS/2 applications are sent to router 224, which invokes mobile print connection manager 210. In addition, mobile print daemon 212 creates a thread for each network printer object for which a transient printer queue has been created. At a user specified interval (in seconds), each thread for a transient printer queue invokes a spooler API to query, via router 224, the remote printer queue assigned to the network printer object in order to determine whether a reconnection has occurred.

When a reconnection occurs for one or more network printer objects, mobile print daemon 212 asks the user if they wish to replay print jobs for those network printer objects in the background (i.e. without invoking mobile print replay GUI 208), or whether they wish to employ mobile print replay GUI 208 to view and manage the associated transient printer queues and the print jobs contained therein. The default is preferably to replay the jobs in the background without invoking mobile print replay GUI 208, thereby reducing the memory footprint of the replay process.

Figure 3A:
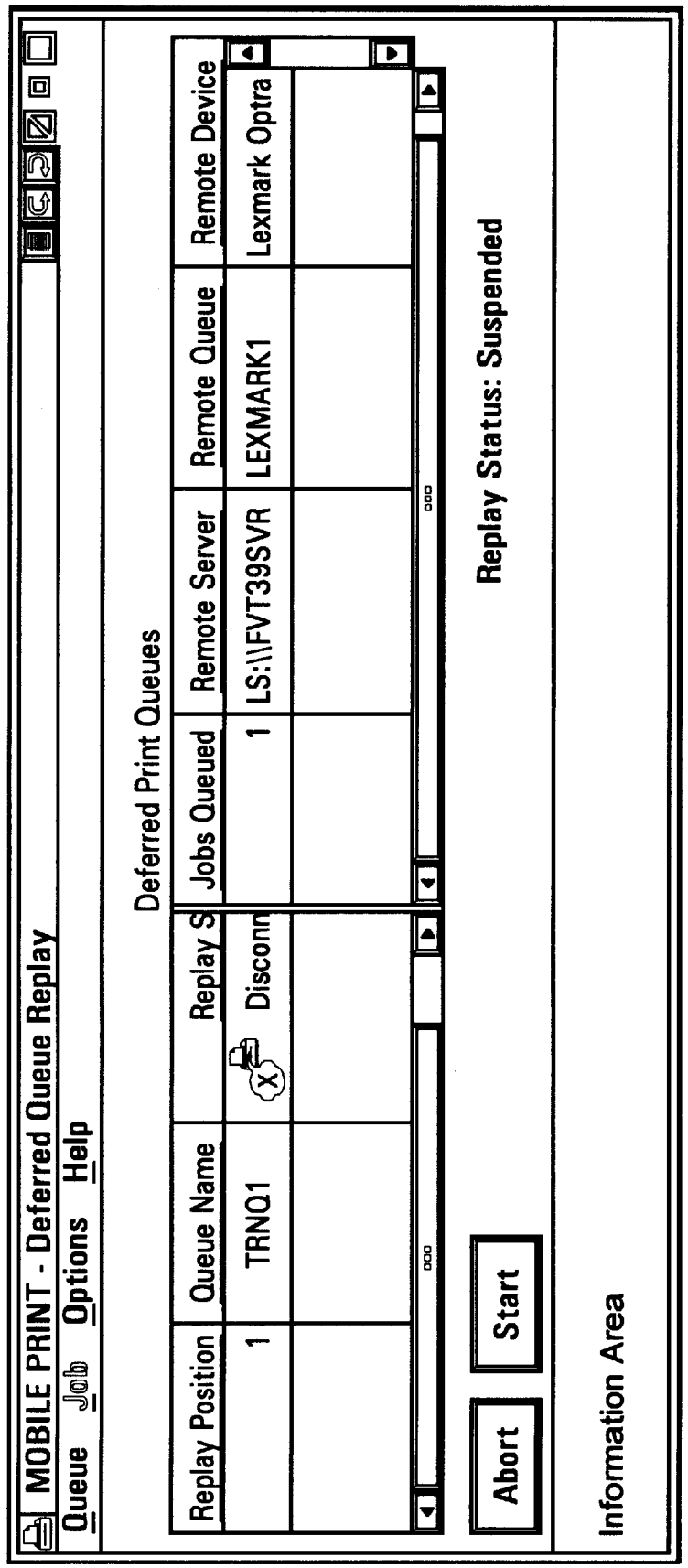
FIGS. 3A–3C depict screen shots for a replay graphical user interface in accordance with a preferred embodiment of the present invention.
Figure 3B:
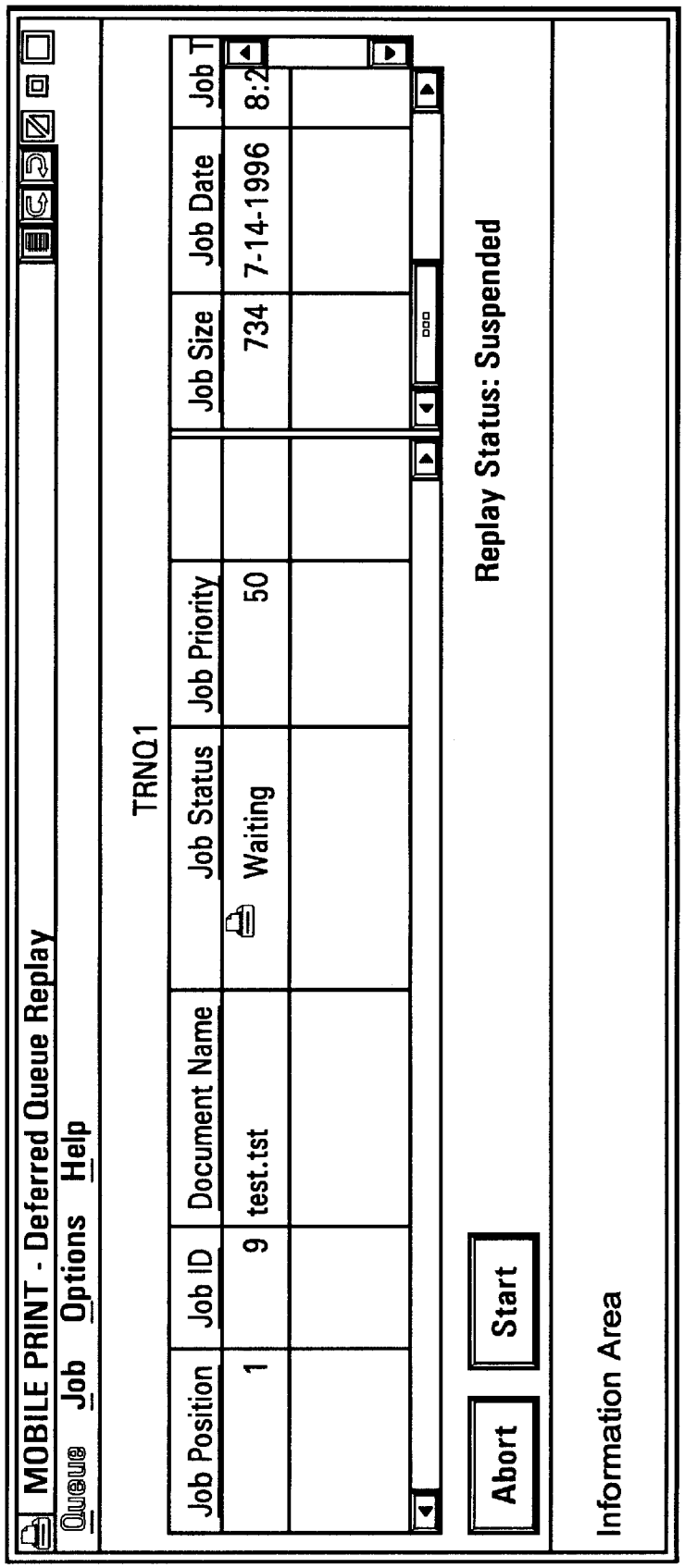
Figure 3C:
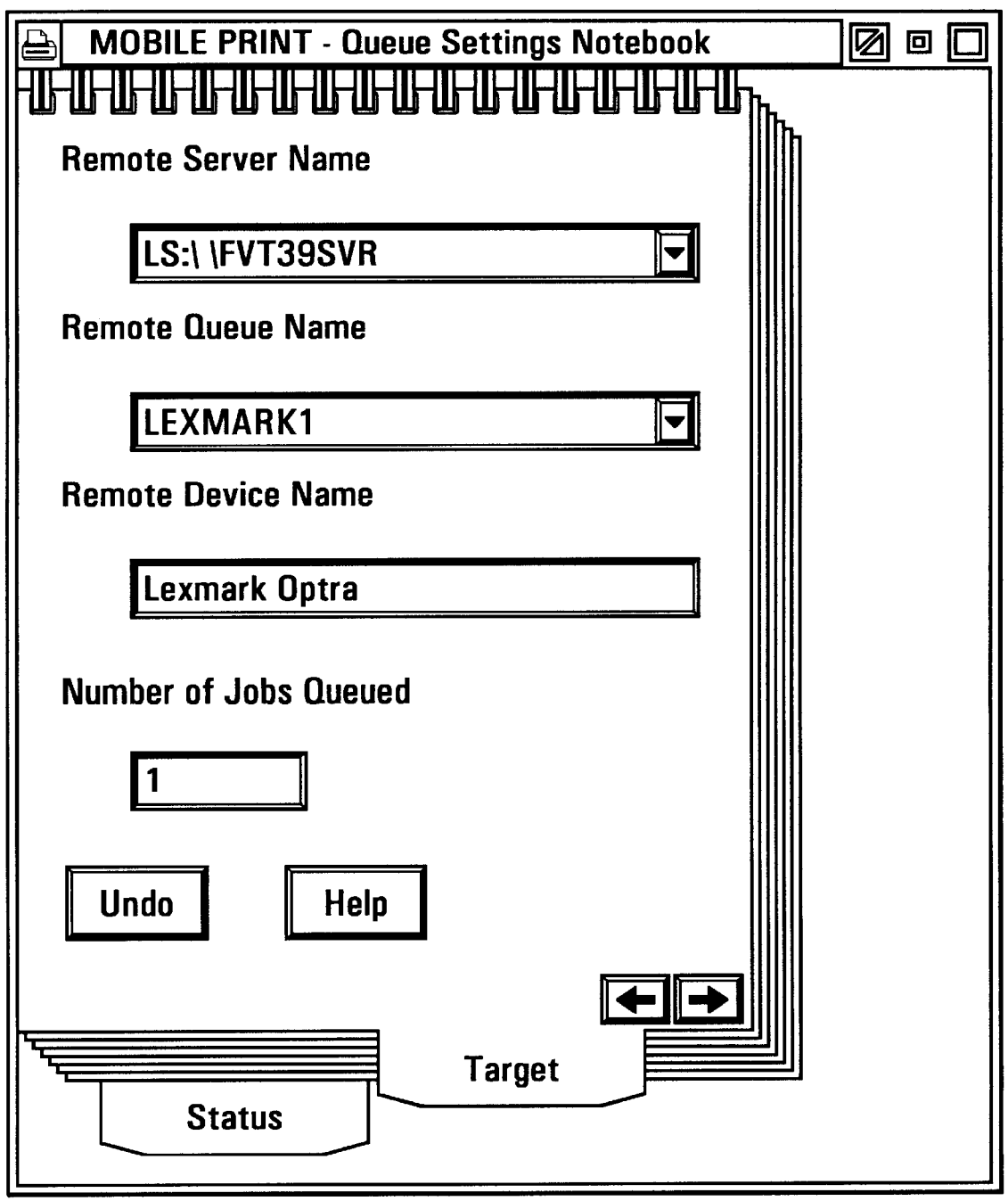

With reference now to FIGS. 3A–3C, screen shots for a replay graphical user interface in accordance with a preferred embodiment of the present invention are depicted. The replay GUI allows a user to view and manage transient printer queues, as well as jobs within the queue. FIG. 3A depicts a list of transient printer queues which may be viewed by a user. The list includes a Queue Name identifier for each transient printer queue currently existing, a Remote Queue identifier for the remote printer queue associated with a transient printer queue, a Remote Server identifier for the target print server (i.e. the data processing system containing the remote printer queue), and a Remote Device identifier for the printer, plotter, or other print device served by the remote printer server.

A Replay Position indicator and a Replay Status icon/indicator for each transient printer queue is also displayed. The Replay Status icon indicates whether the client data processing system employing the mobile print facility is currently disconnected from the remote printer queue, is connected to the remote printer queue and waiting to replay, has been put into the held state by the user, is in complete state with no valid jobs to replay (and is accordingly about to be destroyed), or is in an active state, meaning that jobs are being replayed from the transient printer queue.

By double-clicking on a transient printer queue identifier Queue Name (or by selected the Jobs pull-down menu in the exemplary embodiment), a user may view the print job contents within that transient printer queue as shown in FIG. 3B. Each print job within the selected transient printer queue has a Job Position indicator, a unique Job ID identifier for the print job within the transient printer queue, a Document Name identifier for the source of the print job, a Job Status icon/indicator, a Job Priority indicator, and other information about the print job such as size, date, etc. The Job Status icon indicates whether the print job is currently being transmitted to the remote printer queue, is awaiting replay, has been put into the held state by the user, or experienced an error during the replay process.

While viewing the list of transient printer queues (FIG. 3A) in the main window of the replay GUI, a user may reorder the list by dragging and dropping a job icon or identifier for the transient printer queue. The user may also change the state of a transient printer queue to the held state in order to suspend or bypass the replay or print jobs for that transient printer queue, or may release a held transient printer queue to place it in the waiting state. The user may additionally display the print jobs within a selected transient printer queue, purge all jobs within a selected transient printer queue, or invoke a settings notebook for a selected transient printer queue to modify its characteristics.

FIG. 3C shows a settings notebook for a transient printer queue, which includes a display of a Remote Server identifier for the target print server, a Remote Queue identifier for the remote printer queue associated with the transient printer queue, and a Remote Device identifier for the print device served by the remote printer server and selected for print jobs within the transient printer queue. The user may change any of these settings, shifting a transient printer queue to replay print jobs to a different remote printer queue on a different print server, or selecting a different print device on the same or different print server.

While viewing the list of print jobs within a transient printer queue (FIG. 3B) in the main window of the replay GUI, a user may reorder the list by dragging an icon or identifier for the print jobs from a current position in the list and dropping the icon at a different position in the list. The user may also change the state of a print job within the transient printer queue to the held state to suspend or bypass replay for that print job, or may release a held print job to place it in the waiting state. The user may additionally edit the contents of a print job while it is in the transient printer queue (ASCII files only), copy a print job within the transient printer queue to make a duplicate job, or invoke a settings notebook for a selected print job, allowing the user to modify its characteristics.

The main window of the replay GUI (FIGS. 3A and 3B) also contains a dual state START/STOP pushbutton to control the replay process. This pushbutton will display START when replay is currently suspended and STOP when replay is in progress. START/STOP button is only enabled (and will show START) when a transient printer queue is eligible for replay. If there are no transient printer queues or jobs in them, or if all jobs within the transient printer queues are in a held state, then the START/STOP button is grayed out.

Pushing START/STOP button when START is showing commences the replay engine, which runs on separate thread from the main window of the reply GUI. The replay engine traverses the transient printer queues in the replay order defined by the user, and will make one transient printer queue active at a time by releasing it. At that point, the underlying transient printer queue begins spooling its print jobs to whichever remote printer queue has been predefined or specified by the user. When all print jobs within a transient printer queue have been spooled, the replay engine marks the transient printer queue complete and deletes that transient printer queue. The replay engine will then proceed by activating the next transient printer queue in the specified replay order.

When a replay is in progress, START/STOP button shows STOP and may, when pushed, halt the replay process at any point to allow the user to further manipulate the transient printer queue(s) or the jobs contained therein. Queue and job manipulation pull-down menu bar items are disabled while replay is in progress.

Figure 4A:
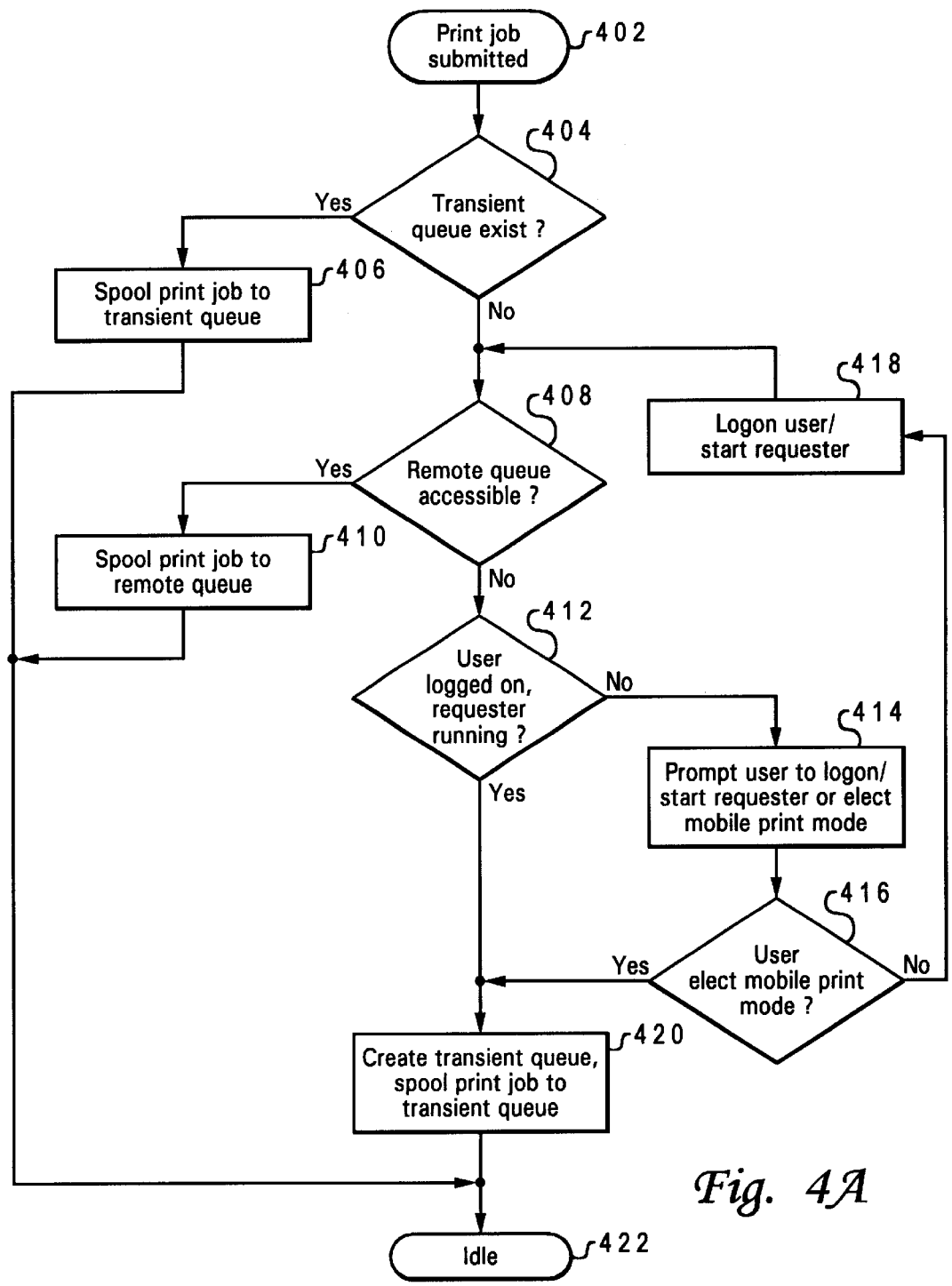
FIGS. 4A–4B are high level flowcharts for processes of employing a mobile print facility in accordance with a preferred embodiment of the present invention.
Figure 4B:
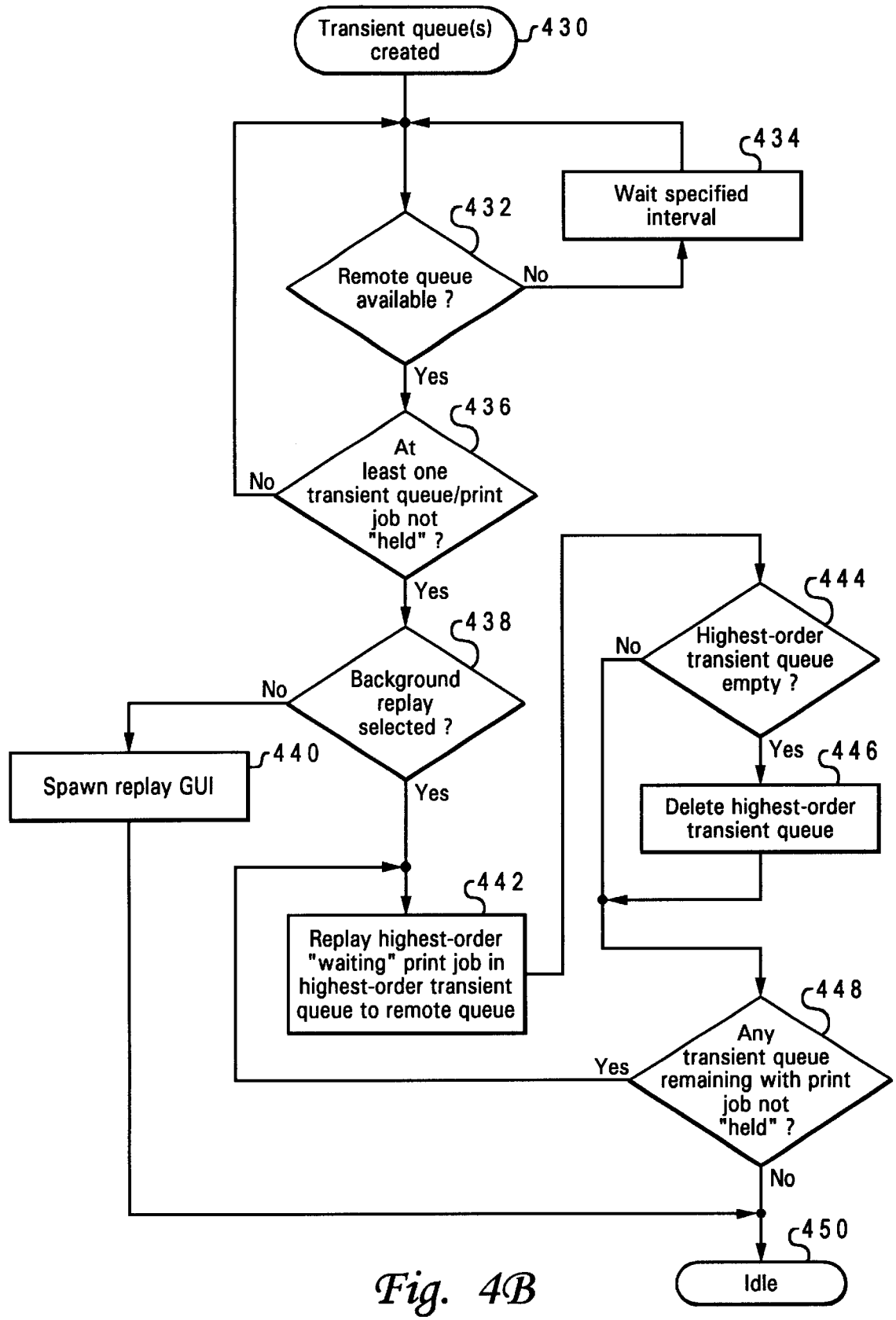

Referring to FIGS. 4A and 4B, high level flowcharts for processes of employing a mobile print facility in accordance with a preferred embodiment of the present invention are illustrated. FIG. 4A illustrates a process of selectively creating a transient printer queue and spooling print jobs to the transient printer queue when a desired remote printer queue is disconnected or inaccessible. The process begins at step 402, which depicts a print job being submitted on the client data processing system which includes a mobile print facility in accordance with the present invention.

The process then passes to step 404, which illustrates a determination of whether a local transient printer queue corresponding to the desired remote printer queue currently exists. If so, the process proceeds to step 406, which depicts simply spooling the submitted print job to the transient printer queue. If not, however, the process proceeds instead to step 408, which illustrates a determination of whether the remote printer queue is disconnected or otherwise inaccessible to the client data processing system. If the remote printer queue is accessible, the process proceeds to step 410, which depicts simply spooling the submitted print job to the remote printer queue.

A remote printer queue may be inaccessible due to disconnection of a client from the remote printer queue or stalling of the remote printer queue, or simply due to failure of the user to logon to the network containing the remote printer queue or to start a requester required to submit print jobs to the remote printer queue. As a result, where the remote printer queue is determined to be inaccessible (step 408), the process proceeds instead to step 412, which illustrates a determination of whether the user is logged on and/or a required requester is running. If not, the process proceeds to step 414, which depicts prompting the user to log and/or start the required requester, or elect mobile print mode.

The process then passes to step 416, which illustrates a determination of whether the user elected mobile print mode. If not, the process proceeds to step 418, which depicts logging the user on to the network containing the desired remote printer queue or starting a required requester, and then back to step 408 for reevaluation of whether the remote printer queue is accessible. If the user elects mobile print mode (step 416), or if the remote printer queue is still unaccessible after determining that the user has logged in and the required requester is running (step 412), the process proceeds instead to step 420, which illustrates creating a local transient printer queue associated with the desired remote printer queue and spooling the submitted print job to that transient printer queue. From any of steps 406, 410, or 420, the process passes to step 422, which depicts the process becoming idle until the next print job is submitted. It should be noted, however, that the process illustrated is specific to a particular remote printer queue. Thus, a number of transient printer queues may be created in the present invention, each for a different remote printer queue.

FIG. 4B illustrates a process for replaying print jobs within one or more transient printer queues to the respective remote printer queues. The process begins at step 430, which depicts at least one transient printer queue being created. The process then passes to step 432, which illustrates a determination of whether any remote printer queues corresponding to currently existing transient printer queues have become accessible. If not, the process proceeds to step 434, which depicts waiting a specified interval, and then returns to step 432 for another determination of whether any desired remote printer queue has become accessible.

Once at least one remote printer queue corresponding to an existing transient printer queue is accessible, the process proceeds instead to step 436, which depicts a determination of whether at least one transient printer queue and print job within a transient printer queue (corresponding to the accessible remote printer queue(s)) is not currently in a "held" state. If not, the process returns to step 432 to continue polling accessible remote printer queues and corresponding transient printer queues until a print job within a transient printer queue is identified as eligible for replay to an accessible remote printer queue.

Once an eligible print job and accessible remote printer queue are identified, the process proceeds to step 438, which depicts a determination of whether background replay (replay on an opportunistic basis without inhibiting operation of other applications or capturing the display and controls of the data processing system) is selected. If not, the process proceeds to step 440, which illustrates spawning the replay GUI for user management of transient printer queues and print jobs therein. If background replay is selected, however, the process proceeds instead to step 442, which depicts replaying the highest-order "waiting" print job in the highest-order ("waiting") transient printer queue to the corresponding (accessible) remote printer queue.

The process then passes to step 444, which illustrates a determination of whether the highest-order transient printer queue is empty. If so, the process proceeds to step 446, which depicts deleting the empty, highest-order transient printer queue, and then to step 448. If the highest order transient printer queue is not yet empty, however, the process instead proceeds directly to step 448, which illustrates a determination of whether any remaining transient printer queue contains a print job which is not in the "held" state. If so, the process returns to step 442 for replay of the (now) highest-order print job in the highest-order transient printer queue which is in a "waiting" state. If not, however, the process proceeds instead to step 450, which depicts the process becoming idle until existing transient printer queues are again detected and/or corresponding remote printer queues become accessible.

Where background replay is not selected, and the user manages the transient printer queues and the print jobs contained therein through the replay GUI, the process of steps 442–448 would be performed in response to the user pushing the START/STOP pushbutton control depicted in FIGS. 3A and 3B. Additionally, where "held" transient printer queues or print jobs are detected, either before or after the "waiting" print jobs have completed replay, the replay GUI may be spawned to permit the user the opportunity to take advantage of an accessible remote printer queue.

The present invention provide mobile print support in a transparent and automatic fashion to mobile data processing system users. No requirement of electing to work offline is necessary when disconnected from a network, and no need to deselect a work offline option arises upon reconnection to the network. Disconnections from the network have no effect apparent to the user, particularly when background replay is selected. The present invention thus permits mobile data processing system users to more easily work without connection to a network. The present invention also permits a mobile data processing system user to more easily switch between networks at different work sites, while managing print jobs submitted while disconnected from either network.

It is important to note that while the present invention has been described in the context of a fully functional data processing system and/or network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile and/or hardcoded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of handling print jobs for a currently inaccessible remote print device, comprising:

responsive to detecting a print job submitted by a mobile device to a remote print queue which is currently inaccessible to the mobile device, determining whether a transient print queue associated with the remote print queue exists within the mobile device;

responsive to determining that the transient print queue does not exist, creating the transient print queue;

spooling the print job to the transient print queue; and providing a user interface to the transient print queue permitting a user to indefinitely suspend replay of the print job from the transient print queue to the remote print queue.

2. The method of claim 1, further comprising:

periodically checking a status of the remote print queue; and responsive to determining that the remote print queue has become accessible, replaying the print job from the transient print queue to the remote print queue to print the print job.

3. The method of claim 1, further comprising:

responsive to determining that the transient print queue exists, spooling the print job to the transient print queue as a second print job within the transient print queue.

4. The method of claim 1, further comprising:

after spooling the print job to the transient print queue, providing a user interface to the transient print queue permitting a user to redirect replay of the print job from the transient print queue to a different remote print queue; and replaying the print job from the transient remote print queue to the different remote print queue selected by the user.

5. The method of claim 1, further comprising:

responsive to determining that the remote print queue has become accessible, automatically replaying the print job from the transient print queue to the remote print queue as a background process.

6. The method of claim 1, further comprising:

responsive to determining that the remote print queue has become accessible, spawning a replay user interface to the transient print queue.

7. The method of claim 1, further comprising:

determining whether the remote print queue is currently accessible based upon whether the mobile device is connected to a system containing the remote print queue, whether the system containing the remote print queue cannot be contacted due to a network error or fault condition, whether the system containing the remote print queue is shut down or offline, whether a user of the mobile device is logged into a network containing the remote print queue, whether a print requester within the mobile device is running, and whether the remote print queue is shared.

8. The method of claim 7, wherein the step of determining whether the remote print queue is currently accessible further comprises:

detecting an error resulting from attempting to print to an inaccessible print queue.

9. A mobile print support mechanism for printing to a currently inaccessible remote print device, comprising:

a network connection for selectively connecting a client data processing system to a network containing a remote print queue for the remote print device;

a mobile print manager executing within the client data processing system, the mobile print manager:

determining whether the remote print queue is currently accessible;

determining whether a transient print queue associated with the remote print queue exists within the client data processing system in response to detecting a print job submitted to the remote print queue while the remote print queue is inaccessible;

creating the transient print queue within the client data processing system if the transient print queue does not exist;

spooling the print job to the transient print queue; and a user interface within the client data processing system to the transient print queue permitting a user to indefinitely to suspend replay of the print job from the transient print queue to the remote print queue after the print job has been spooled to the transient print queue.

10. The mechanism of claim 9, wherein the mobile print manager periodically checks a status of the remote print queue and, in response to determining that the remote print queue has become accessible, replays the print job from the transient print queue to the remote print queue.

11. The mechanism of claim 9, wherein the mobile print manager, in response to determining that the transient print queue exists, spooling the print job to the transient print queue.

12. The mechanism of claim 9, further comprising:

a user interface within the client data processing system to the transient print queue permitting a user to redirect replay of the print job from the transient print queue to a different remote print queue after the print job has been spooled to the transient print queue.

13. The mechanism of claim 9, wherein the mobile print manager, in response to determining that the remote print queue has become accessible, automatically replays the print job from the transient print queue to the remote print queue as a background process.

14. The mechanism of claim 9, wherein the mobile print manager, in response to determining that the remote print queue has become accessible, spawns a replay user interface to the transient print queue.

15. The mechanism of claim 9, wherein the mobile print manager determines whether the remote print queue is currently accessible based upon whether the mobile device is connected to a system containing the remote print queue, whether the system containing the remote print queue cannot be contacted due to a network error or fault condition, whether the system containing the remote print queue is shut down or offline, whether a user of the mobile device is logged into a network containing the remote print queue, whether a print requester within the mobile device is running, and whether the remote print queue is shared.

16. The mechanism of claim 9, wherein the mobile print manager interfaces with a network independent layer of an operating system to function with any network supporting a network independent API within the network independent layer.

17. A method of supporting mobile printing to a currently inaccessible print queue, comprising:

determining whether at least one transient print queue associated with a remote print queue for a remote print device exists within a mobile device;

responsive to determining that at least one transient print queue exists, periodically checking an accessibility status for the remote print queue corresponding to the at least one transient print queue; and responsive to determining that the remote print queue has become accessible, replaying print jobs within the at least one transient print queue to the remote print queue by determining whether the at least one transient print queue contains at least one print job not in a held state.

18. The method of claim 17, wherein the step of replaying print jobs within the at least one transient print queue to the remote print queue further comprises:

determining whether a background replay option is selected;

responsive to determining that the background replay option is selected, replaying print jobs within the at least one transient queue to the remote print queue in a background process; and responsive to determining that the background replay option is not selected, spawning a replay user interface allowing a user to manage print jobs within the at least one transient print queue.

19. The method of claim 17, further comprising:

determining whether at least one transient print queue is in a held state.

20. The method of claim 17, further comprising:

selecting a highest order transient print queue from a plurality of transient print queues each associated with a different remote print queue;

selecting a highest order print job which is not in a held state from a plurality of print jobs within the selected transient print queue; and replaying the selected print job to a remote print queue corresponding to the selected transient print queue.

21. The method of claim 17, further comprising:

determining whether at least one transient print queue is empty; and responsive to determining that at least one transient print queue is empty, deleting at least one transient print queue.

22. A data processing system, comprising:

a network connection for selectively connecting the data processing system to a network containing a remote print queue; and a mobile print manager executing within the data processing system, the mobile print manager:

determining whether the remote print queue is currently accessible to the data processing system;

determining whether a transient print queue associated with the remote print queue exists within the data processing system in response to detecting a print job submitted to the remote print queue while the remote print queue is inaccessible;

creating the transient print queue if the transient print queue does not exist;

spooling the print job to the transient print queue; and providing a user interface to the transient print queue permitting a user to indefinitely suspend replay of the print job from the transient print queue to the remote print queue.

23. A computer program product in a computer usable medium, comprising:

instructions within the computer usable medium, responsive to detecting a print request within a mobile client system for a remote print queue, for determining whether the remote print queue is currently accessible to the mobile client system;

instructions within the computer usable medium, responsive to determining that the remote print queue is not currently accessible to the mobile client system, for determining whether a transient print queue exists within the mobile client system for the remote print queue;

instructions within the computer usable medium, responsive to determining that a transient queue does not exist within the mobile client system for the remote print queue, for creating a transient print queue within the mobile client system for the remote print queue;

instructions within the computer usable medium for spooling a print job corresponding to the print request to the transient print queue;

instructions within the computer usable medium, responsive to detecting the existence of the transient print queue for the remote print queue, for periodically determining whether the remote print queue is currently accessible to the mobile client system; and instructions within the computer usable medium, responsive to determining that the remote print queue is currently accessible to the mobile client system while the transient queue for the remote print queue exists within the mobile client system, for automatically replaying print jobs within the transient print queue to the remote print queue or to a different remote print queue selected by a user.

24. The computer program product of claim 23, further comprising:

instructions within the computer usable medium providing a user interface permitting a user to reorder print jobs within the transient print queue by dragging an icon associated with a print job and dropping the icon at a new position within a list of print jobs within the transient print queue.

25. The computer program product of claim 23, further comprising:

instructions within the computer usable medium providing a user interface permitting a user to edit a print job within the transient print queue.

26. The computer program product of claim 23, further comprising:

instructions within the computer usable medium providing a user interface permitting a user to copy a print job within the transient print queue to create a duplicate print job.

* * * * *